United States Patent
Morlacchi

(10) Patent No.: US 9,315,002 B2
(45) Date of Patent: Apr. 19, 2016

(54) PROCESS AND MACHINE FOR MEMBRANE LAMINATION AND ARTICLE PRODUCED WITH SAME

(71) Applicant: Matteo Morlacchi, Busto Arsizio (IT)

(72) Inventor: Matteo Morlacchi, Busto Arsizio (IT)

(73) Assignee: OutDry Technologies Corporation, Portland, OR (US)

( * ) Notice: Subject to any disclaimer, the term of this patent is extended or adjusted under 35 U.S.C. 154(b) by 56 days.

(21) Appl. No.: 13/830,409

(22) Filed: Mar. 14, 2013

(65) Prior Publication Data

US 2014/0027055 A1    Jan. 30, 2014

Related U.S. Application Data

(60) Provisional application No. 61/675,670, filed on Jul. 25, 2012.

(51) Int. Cl.
*B32B 37/10* (2006.01)
*B29C 63/26* (2006.01)
*B32B 37/06* (2006.01)
*B32B 37/12* (2006.01)

(52) U.S. Cl.
CPC ............... *B32B 37/10* (2013.01); *B29C 63/26* (2013.01); *B32B 37/06* (2013.01); *B32B 37/1207* (2013.01)

(58) Field of Classification Search
CPC  B32B 37/10; B32B 37/1207; B32B 2437/02; B29C 63/00; B29C 63/26; B29C 63/28
USPC ......................................... 156/156, 285, 287
See application file for complete search history.

(56) References Cited

U.S. PATENT DOCUMENTS

| 4,010,877 | A | 3/1977 | Hayes et al. |
| 4,206,631 | A * | 6/1980 | Nysse et al. ..................... 73/40 |
| 4,776,209 | A | 10/1988 | Patchel |
| 7,645,353 | B2 | 1/2010 | Thomaschefsky et al. |
| 7,803,438 | B2 | 9/2010 | Flather et al. |
| 7,971,275 | B2 | 7/2011 | Saunders et al. |
| 2004/0038842 | A1 | 2/2004 | Fagg et al. |
| 2005/0095273 | A1 | 5/2005 | Yano et al. |
| 2005/0118916 | A1 | 6/2005 | Ducker et al. |
| 2008/0121835 | A1 | 5/2008 | Morlacchi |
| 2008/0156436 | A1 | 7/2008 | Johnson et al. |
| 2010/0018636 | A1* | 1/2010 | Ostani ......................... 156/156 |

FOREIGN PATENT DOCUMENTS

| CN | 2426689 Y | 4/2001 |
| FR | 2643713 | 8/1990 |

(Continued)

OTHER PUBLICATIONS

Chinese Office Action for CN 201310187552.3 dated May 20, 2014 (including English translation).

*Primary Examiner* — Philip Tucker
*Assistant Examiner* — John Blades
(74) *Attorney, Agent, or Firm* — Schwabe, Williamson & Wyatt, P.C.

(57) ABSTRACT

Embodiments provide a lamination machine for laminating a membrane to a fabric of an article, such as to an inside surface of a backpack. The lamination machine may include an enclosure with a rotating air connection coupled to a top surface of the enclosure. The membrane may be mated with the article, and then a plug may be inserted in a top opening of the article. The plug may be coupled with the rotating air connection. The rotating air connection may pump compressed air into an interior portion of the article, through an inlet in the plug. A heater may heat the area surrounding the article to activate an adhesive disposed between the membrane and the inside surface of the article. Additionally, the rotating air connection may rotate the plug, thereby rotating the article assembly to facilitate distribution of heat.

7 Claims, 4 Drawing Sheets

(56) References Cited

FOREIGN PATENT DOCUMENTS

| | | |
|---|---|---|
| JP | 40-35878 | 12/1965 |
| JP | 51-131584 | 11/1976 |
| JP | 7-155682 | 6/1995 |
| JP | 7-216609 | 8/1995 |
| JP | 8-109504 | 4/1996 |
| JP | 9-296312 | 11/1997 |
| JP | 2000-175938 | 6/2000 |
| JP | 2003-532802 | 11/2003 |
| WO | 01/56415 | 8/2001 |
| WO | 2008/028913 | 3/2008 |

* cited by examiner

1

PROCESS AND MACHINE FOR MEMBRANE LAMINATION AND ARTICLE PRODUCED WITH SAME

CROSS REFERENCE TO RELATED APPLICATIONS

The present application claims priority to U.S. Provisional Patent Application No. 61/675,670, filed Jul. 25, 2012, entitled "PROCESS AND MACHINE FOR MEMBRANE LAMINATION AND ARTICLE PRODUCED WITH SAME," the entire disclosure of which is hereby incorporated by reference in its entirety.

TECHNICAL FIELD

Embodiments herein relate to the field of manufacturing, and, more specifically, to a process and machine for membrane lamination.

BACKGROUND

In many articles, such as backpacks, bags, and/or clothing, a membrane is laminated to the article to provide protection and/or other functions. For example, many articles include a waterproof membrane laminated to a fabric to provide protection from liquids and/or other substances. However, it can be difficult to laminate the membrane to the fabric with even adhesion and/or in an efficient manner.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
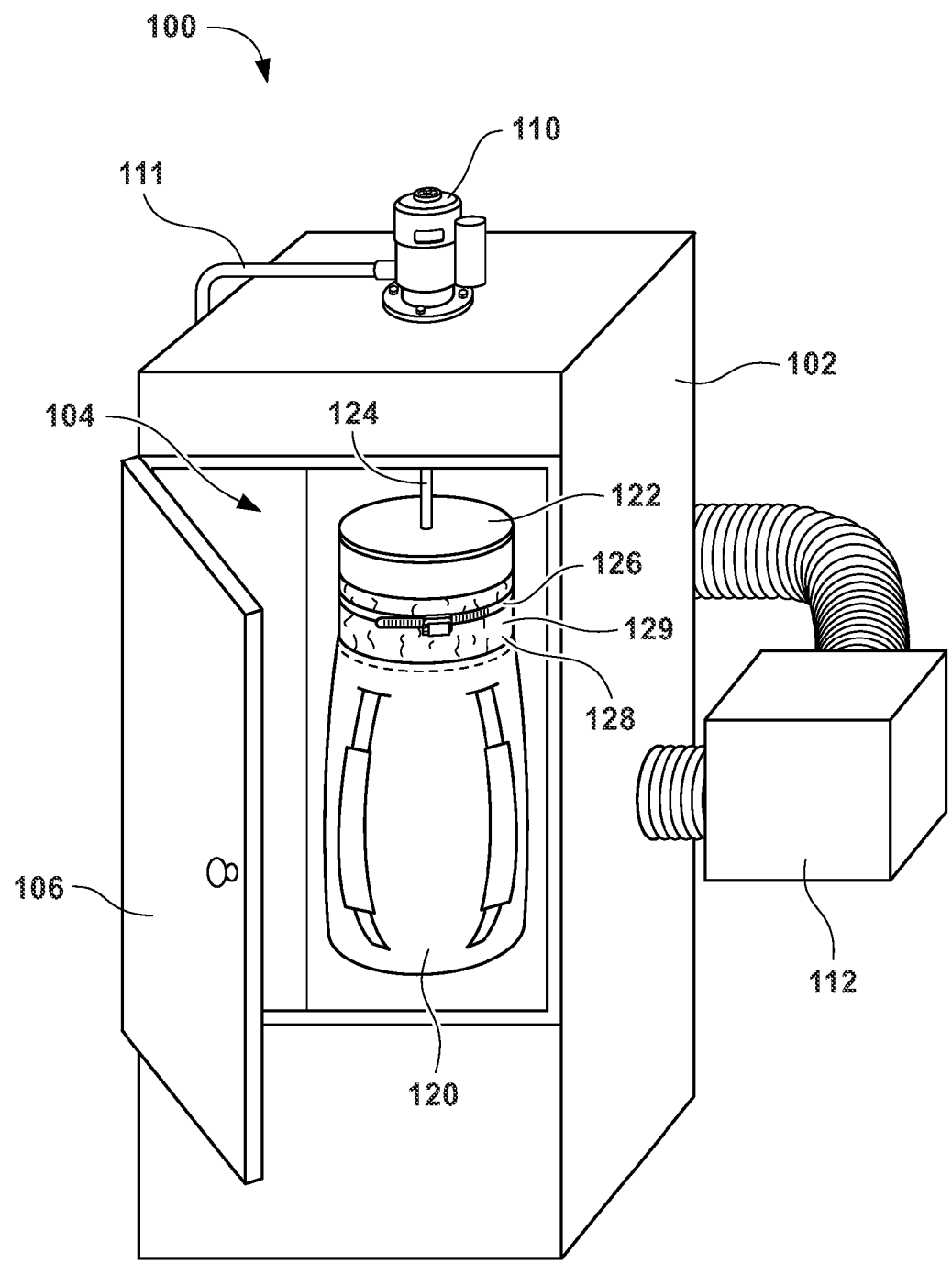
FIG. 1 illustrates a lamination machine and a backpack in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a lamination machine for laminating a membrane to a fabric of an article, such as a backpack. Although the lamination machine is discussed herein with reference to a backpack, it will be apparent that the lamination machine may be used to laminate a membrane to any suitable type of article, such as a backpack, a bag or other parcel, a jacket, pants, a full-body jump-suit, and/or another article. Embodiments herein may be particular useful for larger articles, such as backpacks, pants, etc. given the configuration of the device, as opposed to other laminating devices.

In various embodiments, the membrane may be waterproof and/or may have one or more other suitable characteristics. The membrane may or may not also be breathable.

In various embodiments, the lamination machine may laminate (e.g., adhere) the membrane to an inside surface of the article by pumping compressed air into an interior portion of the article to press the membrane against the inside surface of the article. The pressure of the compressed air may provide substantially even pressure across the inside surface of the article, thereby facilitating uniform adhesion of the membrane to the fabric. Additionally, the lamination process described herein may not require the use of seam sealing at seams of the membrane and/or article. Although the lamination process is discussed herein with reference to compressed air, in other embodiments any suitable type of fluid may be used, such as air and/or nitrogen.

An adhesive may be disposed between the membrane and the inside surface of the article to adhere the membrane to the article. In some embodiments, the adhesive may be heat-activated. The lamination machine may apply heat to activate the heat-activated adhesive. In some embodiments, the lamination machine may heat the air surrounding the article. Alternatively, or additionally, the air pumped into the interior portion of the article may be heated (e.g., before and/or after being pumped into the interior portion).

In some embodiments, the adhesive may be pre-applied to and/or integrated with the membrane. In other embodiments, the adhesive may be applied to the membrane and/or the inside surface of the article during the lamination process. The adhesive may form a continuous layer on the membrane and/or may be arranged in a pattern, such as a dot-matrix, in rows, and/or in another orientation/configuration. The use of a patterned adhesive avoids complete occlusion of the membrane and thus assists in maintaining the breathability of the membrane.

In some embodiments, one or more additional layers and/or materials may be included in the membrane. For example, the membrane may include a waterproof layer, a heat-activated adhesive, and a protective layer. In some embodiments, the adhesive may be disposed on a first side of the waterproof layer, and the protective layer may be disposed on a second side of the waterproof layer. The protective layer may protect the waterproof layer from abrasion (e.g., caused by items inside the backpack). The protective layer may include any suitable material, such as monofilament nylon knit (e.g., 2-denier half tricot). Monofilament nylon knit has high resistance to abrasion and low wicking of moisture (e.g., to avoid water being wicked into other layers of the backpack).

In some embodiments, prior to mating the membrane with the article, the membrane may be formed in a three dimensional conformation corresponding to the shape of the inside surface of the article. For example, the membrane may be formed by one or more panels coupled together (e.g., by stitching, adhesive, and/or tape sealing). In some embodiments, the panels may overlap at the edges with the adjoining panel. The panels may overlap with the adhesive layer of one panel against the adhesive layer of the adjoining panel, or with the adhesive layer of one panel against the protective layer of the adjoining panel.

The membrane may then be placed against the inside surface of the article. In an embodiment configured for a backpack, the three-dimensional membrane may include an opening at the top of the membrane. In some embodiments, the membrane may be placed into the interior portion of the article without added air pressure and/or with a relatively low air pressure. The air pressure may then be increased (e.g., by pumping compressed air), to press the membrane against the inside surface of the article. In embodiments, before and/or during the introduction of air, heat may also be applied to the membrane/article from outside or inside the article.

In other embodiments, the article may be initially turned inside-out (e.g., with the inside surface directed outward), and the membrane may be placed over the article. The article and membrane may then be inverted so that the membrane is on the inside of the article (e.g., with the inside surface directed inward). In embodiments, the article and membrane may be inverted as noted above, prior to introduction of air/heat.

In some embodiments, heat may be selectively applied to one or more portions of the membrane and/or article to activate the adhesive in one or more regions prior to placing the article in the lamination machine. For example, heat may be selectively applied to a bottom portion of the inside surface of the article and/or at or near a top edge of the article to activate the adhesive and adhere the membrane to the article in those areas. Heat may be selectively applied by any suitable mechanism, such as an iron. In some embodiments, the heat may be selectively applied with the article in the inside-out orientation to facilitate access to the inside surface. In other embodiments, heat may not be applied to the article prior to placing the article assembly in the lamination machine.

In various embodiments, the combined article and membrane assembly may be fitted with a plug to block the opening of the membrane and/or article. The plug may include an inlet to allow compressed air to be pumped into the interior portion of the article.

In some embodiments, the plug may also include an outlet to allow air to escape. The outlet may be selectively opened and/or closed to allow air to escape. In some embodiments, the outlet may be selectively opened and/or closed to control the temperature and/or pressure of the air in the interior portion of the article. For example, the compressed air may be introduced to the interior portion at a first temperature T1 and a first pressure P1. The outlet and inlet/pump may be controlled to allow air to escape and/or new compressed air to be introduced to maintain a set temperature and/or pressure in the interior portion. For example, the temperature may be maintained at a second temperature T2 and the pressure may be maintained at a second pressure P2, where T1 is greater than T2 and P2 is greater than P1.

In some embodiments, a collar (e.g., clamp collar) may be applied around the plug to hold the membrane and/or article tightly to the plug. In some embodiments, a sleeve of extra material (e.g., fabric) may be coupled to the top edge of the article (e.g., at the top opening). The sleeve may be coupled to the top edge of the article by stitching and/or by other means. The collar may then be installed around the sleeve. This may allow the article to hang below the plug so that the compressed air may apply pressure across the entire inside surface of the article, and the membrane can be laminated to the article without encumbrance from the plug.

In some embodiments, the sleeve may be formed from the membrane. For example, the membrane may be disposed against the inside surface of the article and may extend upward from the opening of the article. In some embodiments, the membrane may be coupled to the top edge of the article prior to placing the combined assembly in the lamination machine. In other embodiments, the sleeve may be formed from a separate material from the membrane.

In various embodiments, the article, membrane, and plug may be inserted in the lamination machine. The lamination machine may include an enclosure (e.g., housing), with a door to access the interior of the enclosure. The plug may be coupled to a top surface of the interior of the enclosure, and the article is permitted to hang freely from the plug. As noted above, this orientation may be especially suitable for large and/or heavy articles, such as backpacks, pants, and the like.

In some embodiments, the lamination machine may further include an air connector coupled to the top surface of the interior of the closure. The plug may be coupled to the air connector (e.g., via the inlet of the plug). The air connector may be coupled with an air supply to introduce compressed air into the interior portion of the article through the plug. Alternatively, as noted above, another type of fluid may be used, such as nitrogen gas. In some embodiments, the membrane may be pressurized prior to inserting the combined assembly into the lamination machine. In these embodiments, the lamination machine may or may not include an air supply.

In some embodiments, the air connector may also be configured to rotate, thereby rotating the plug and the article assembly. For example, the rotating air connector may be coupled to a motor (e.g., an electric motor) on the lamination machine. The rotation of the article assembly may facilitate distribution of heat across the article and/or membrane to activate the adhesive. In some embodiments, the article may be rotated relatively slowly, such as about 1 to 3 revolutions per minute.

In other embodiments, the lamination machine may include separate components for pumping air through the inlet and for rotating the article assembly. For example, a rotational axis may couple the plug to the motor for rotating the motor, and the inlet may be coupled to the air supply via a separate air connector.

The lamination machine may further include one or more heaters to heat the interior of the enclosure. The lamination machine may include one or more fans to circulate the heated air throughout the interior of the enclosure. In some embodiments, the lamination machine may include a plurality of fans to facilitate even distribution of the heated air.

In some embodiments, the heater may heat the air pumped into the interior portion of the article in addition to, or instead of, heating the air surrounding the article. The lamination machine may include a fan disposed in the interior portion of the article to circulate the heated air around the interior portion, thereby facilitating an even distribution of heat over the membrane and/or adhesive.

During the lamination process, the article may be mated with the membrane and coupled to the plug as described above, and the assembly may be inserted in the lamination machine. The plug may be coupled with the rotating air connector on the top surface of the lamination machine. Compressed air may then be pumped into the interior of the article to apply pressure to the membrane, thereby pressing the membrane against the inside surface of the article. Additionally, the heater and/or fans may be activated to distribute heat around the article. In some embodiments, the compressed air may be introduced to pressurize the interior of the article prior to activating the heat and thus prior to activating the adhesive. This may facilitate the proper arrangement of the membrane with respect to the article.

In some embodiments, the pressure of the interior portion of the article may vary during the lamination process. The lamination machine may include a control system for adjusting the air supply to achieve the variable pressure. For example, the pressure of the interior portion may be brought to a first pressure for a first period of time and then raised to a higher pressure for a second period of time. In one embodiment, the interior portion may first be brought to a pressure of about 1 to 5 kPa for about 2 to 4 minutes, and then to a pressure of about 7 to 10 kPa for about 10 to 60 seconds. Alternatively, a single pressure in the range of about 3 to 8 kPa may be used.

Figure 2:
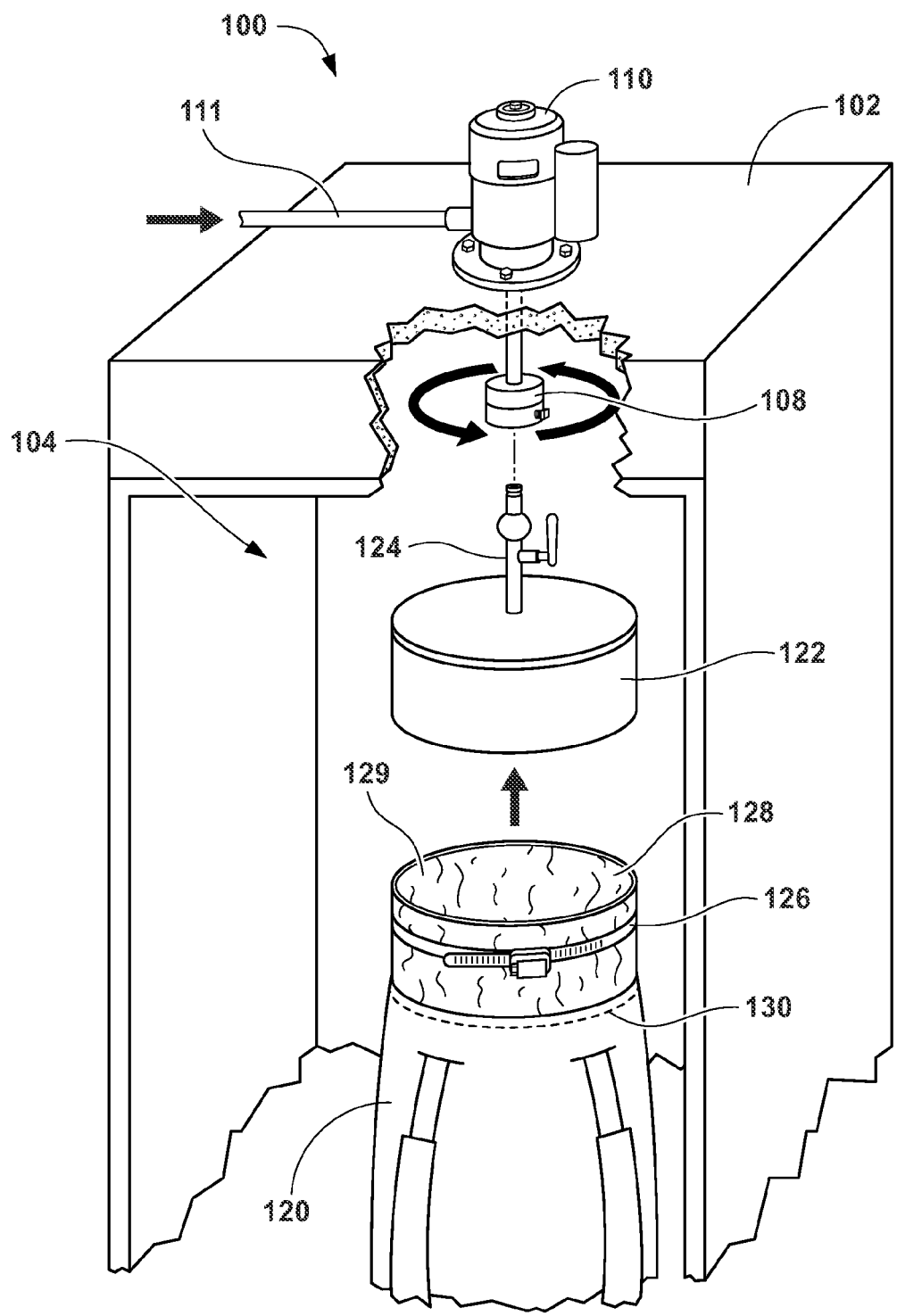
FIG. 2 illustrates a close-up and partially exploded view of a lamination machine and backpack in accordance with various embodiments.

FIGS. 1 and 2 illustrate a lamination machine 100 in accordance with various embodiments. The lamination machine 100 includes a housing 102 defining an interior portion 104. An insulated door 106 provides access to interior portion 104. The lamination machine 100 further includes a rotating air connector 108 coupled to a top surface of interior portion 104. An electric motor 110 is coupled to the rotating air connector 108 to rotate rotating air connector 108 (as seen in FIG. 2). In some embodiments, the electric motor 110 may include a gear reduction to provide a desired rate of rotation, such as about 1 to 3 rotations per minute. The rotating air connector 108 is coupled with an air supply 111 to provide compressed and/or heated air and/or other fluid.

The lamination machine 100 further includes a heater 112 to heat the interior portion 104 of the housing 102. The lamination machine 100 may include one or more fans (not shown) to distribute the heat throughout the interior portion 104.

In various embodiments, a backpack 120 is fitted with a membrane 128 against an inside surface of the backpack 120. The membrane 128 may have a three-dimensional conformation that is shaped to correspond to the inside surface of the backpack 120. A heat-activated adhesive is disposed between the membrane and the inside surface of the backpack.

In some embodiments, the membrane 128 may extend upward past the opening in the backpack 120 to form a sleeve 129. A plug 122 is inserted in a top opening of the sleeve 129, and the sleeve 129 is secured to the plug 122 by a clamping belt 126. The sleeve 129 allows backpack 120 to hang below plug 122, thereby facilitating compressed air being distributed over the inside surface of backpack 120. The sleeve 129 may be coupled to a top edge of the backpack 120 by stitching 130. The sleeve 129 may be removed (unstitched, cut-away, etc.) after lamination of the membrane 128 to the inside surface of the backpack 120. In other embodiments, the sleeve 129 may be formed of a different material from the membrane 128 disposed against the inside surface of the backpack 120, and then removed after lamination of the membrane to the article.

In various embodiments, the plug 122 may have any suitable shape to prevent air from escaping the top opening, such as cylindrical or frustoconical. The plug 122 includes an inlet 124 configured to mate with the rotating air connector 108 to receive compressed air and/or for rotation of the plug 122.

In various embodiments, the backpack 120 is provided with the membrane and coupled with plug 122 as shown. Prior to or after backpack 120 being coupled to plug 122, plug 122 is coupled with the rotating air connector 108 in lamination machine 100 and the door 106 is closed.

After the backpack assembly (e.g., including the backpack 120, membrane 128, and plug 122) is coupled to the rotating air connector 108, a lamination process is then initiated. In the lamination process, compressed air is pumped via air connector 108 into the interior portion of backpack 120 (e.g., through inlet 124 of plug 122). The compressed air presses the membrane 128 against the inside surface of backpack 120. The compressed air may provide even pressure across the membrane 128 to conform the shape of the membrane 128 to the inside surface of backpack 120.

The lamination process further includes activating the heater 112 to heat the interior portion 104 of the lamination machine 100 and/or the compressed fluid pumped into the article. The heat activates the heat-activated adhesive, thereby adhering the membrane to the inside surface of the backpack 120. In an embodiment, heat is applied such that the interior portion 104 is at a temperature of about 110° C. to 130° C., such as 120° C., and the backpack is at a temperature of about 80° C. to 100° C., such as 90° C.

The backpack 120 is rotated by rotating air connector 108 during heating to facilitate even distribution of heat around backpack 120. In some embodiments, the compressed air introduced into the interior of backpack 120 may also be heated, providing simultaneous pressure to the membrane and activation of the adhesive. In some embodiments, heated air introduced inside the backpack may be the only source of activating heat.

In some embodiments, the rotation of the rotating air connector 108 and/or the heater(s) may automatically start when the door 106 is closed. In other embodiments, the rotation and/or heater(s) may not occur automatically upon closing the door 106.

The lamination machine 100 may include one or more controls, such as buttons and/or levers, for activating and/or controlling the lamination process.

In some embodiments, as discussed above, the lamination process may include applying a lower pressure to the interior of the backpack for a first time period, and then raising the pressure to a higher pressure for a second time period.

After completion of the heating operation, backpack 120 may be cooled. In some embodiments, the backpack 120 may be removed from the lamination machine 100 for cooling. In some embodiments, backpack 120 may be cooled under pressure (e.g., with pressure remaining in the interior portion of backpack 120). In some embodiments, additional air may be pumped into the interior portion of the backpack for cooling. The additional air may be ambient temperature (e.g., the temperature outside the lamination machine 100) or may be cooled, such as to a temperature of about 5° C. to 15° C., such as 10° C. In these embodiments, the plug 122 may include an outlet to release air from the interior portion.

Plug 122 may be uncoupled from backpack 120 before, during, or after cooling. The sleeve 129 and/or any excess portions of the membrane 128 may be removed from backpack 120.

In various embodiments, the lamination process may result in the membrane being evenly bonded to the inside surface of the backpack 120. Using air pressure to press the membrane 128 against the inside surface may provide uniform adhesion with few or no pleats or wrinkles. Additionally, the top-mounted plug 122 and air connector 108 may allow large and/or heavy articles, such as backpack 122, to be laminated with the membrane 128 in this manner. This arrangement of fluid pressurizing a large article and heating the adhesive/membrane would not work as well if the article were in an upright configuration, or at a minimum such an alternative arrangement would require a far greater application of pressure to hold the article upright, which would put unnecessary strain on the membrane, seams, and stitches.

Figure 3:
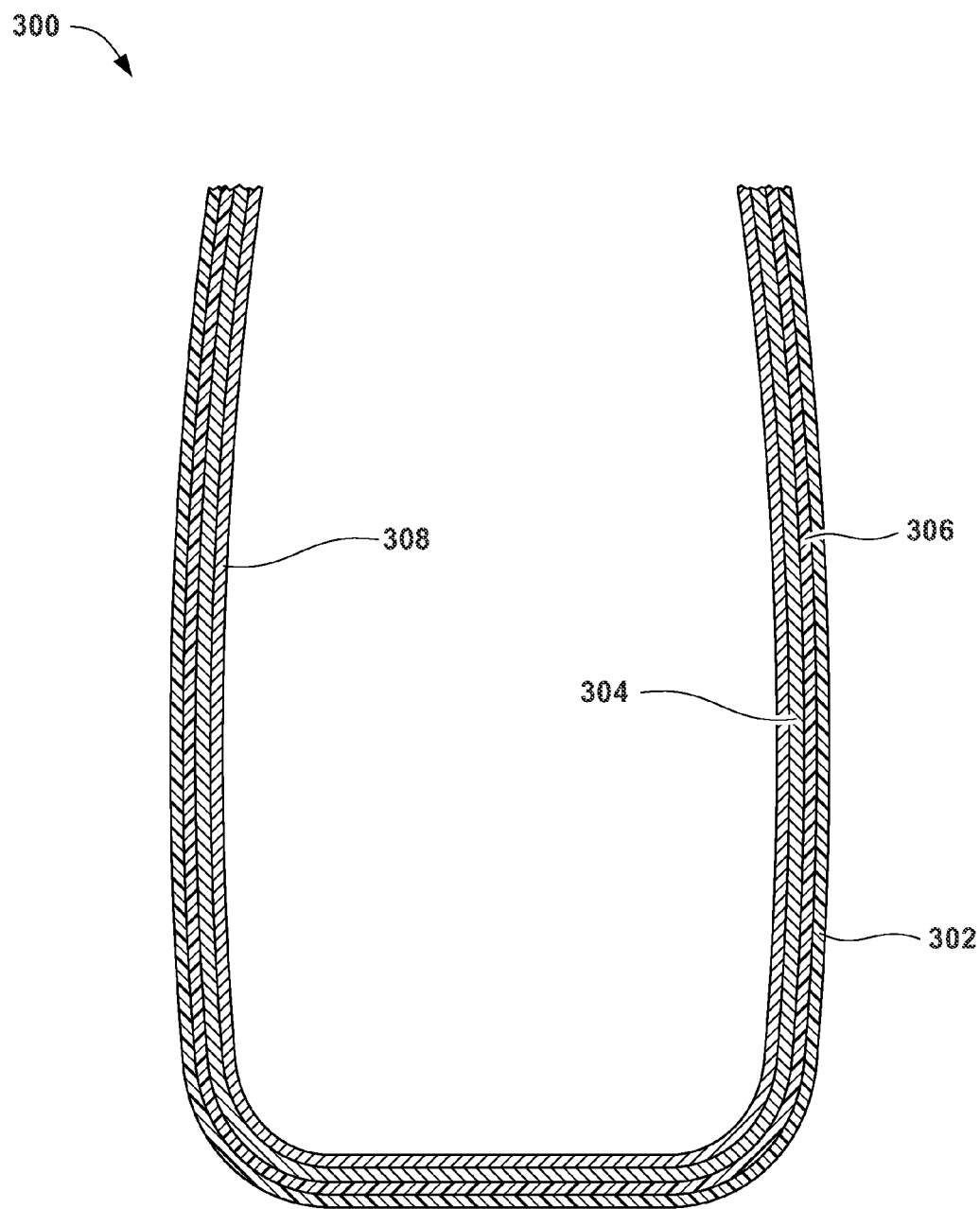
FIG. 3 illustrates a cross-sectional view of a backpack in accordance with various embodiments.

FIG. 3 shows a cross-sectional view of a backpack 300 with a fabric body 302 that is laminated with a membrane 304 in accordance with various embodiments. An adhesive 306 is disposed between the body 302 and membrane 304 to bond the membrane 304 to the adhesive 306. In various embodiments, the membrane 304 may be waterproof and/or have other suitable qualities. The membrane 304 may or may not be breathable.

As shown, the membrane 304 is further coupled to a protective layer 308 on the inside surface of the membrane 304. The protective layer 308 may be, for example, a nylon monofilament knit. The protective layer 308 may protect the membrane 304 from abrasion. The adhesive 306 may be disposed against the membrane 304, and the protective layer 308 may face the interior of the backpack 300.

In some embodiments, the backpack 300 may include more or less layers, and/or a different arrangement of layers than are shown in FIG. 3.

The lamination process described herein may result in the membrane 304 being uniformly, or substantially uniformly, adhered to the inside surface of the backpack body 302 (e.g., with few or no wrinkles). Additionally, the lamination process may not require the use of seam sealing on the seams of the body 302.

Figure 4:
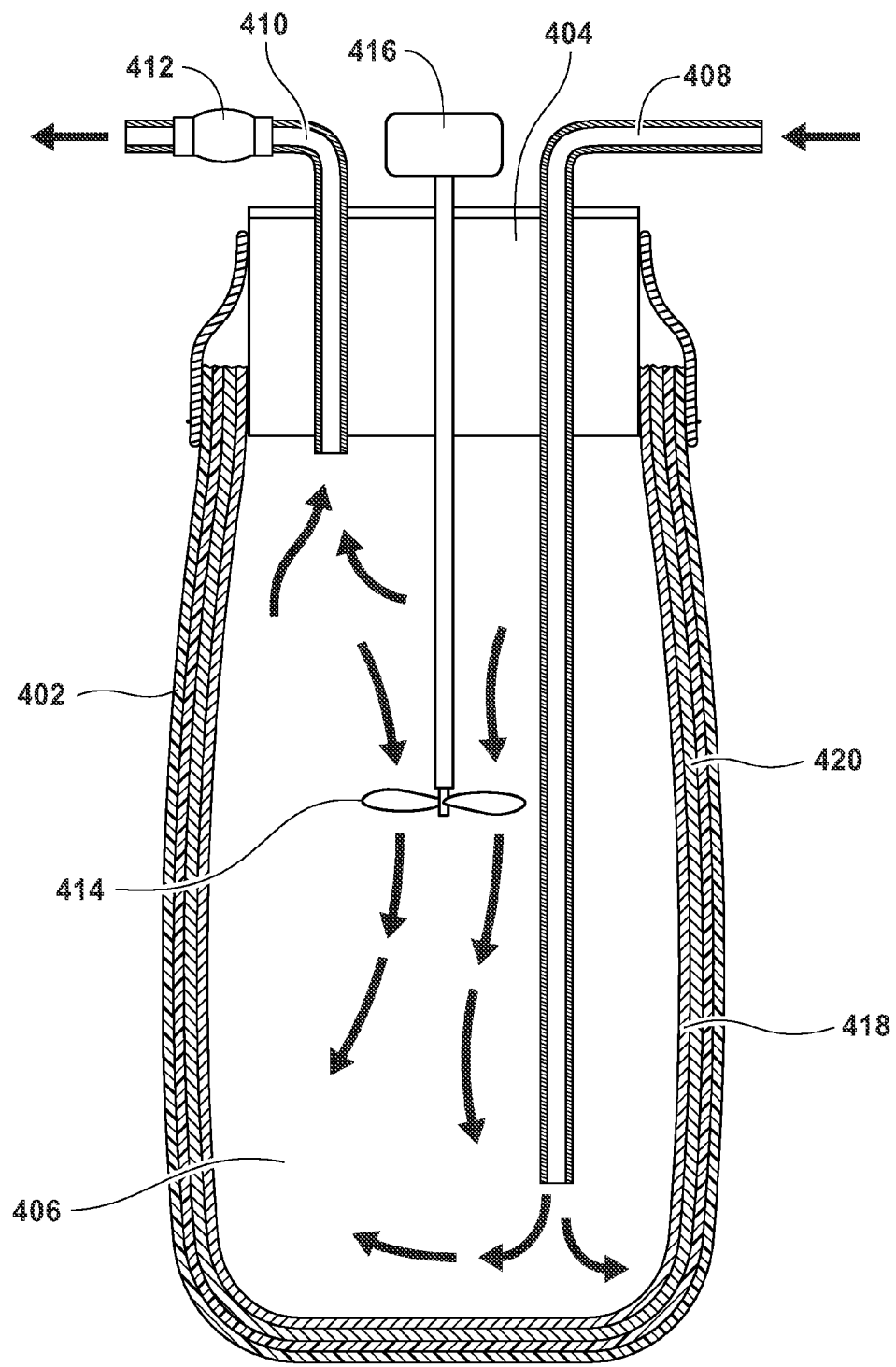
FIG. 4 illustrates a cross-sectional view of a backpack and plug in accordance with various embodiments.

FIG. 4 illustrates a backpack 402 with a plug 404 that facilitates even distribution of heated and compressed air in the interior portion 406 of the backpack 402. The plug 404 includes an inlet 408 for introducing heated and compressed air into the interior portion 406. The plug 404 further includes an outlet 410 for allowing the heated and compressed air to escape the interior portion 406. The outlet 410 may include a flow regulator 412 for controlling the rate of flow of air through outlet 410. The plug 404 may further include a fan 414 coupled to a motor 416. The blades of fan 414 may rotate to circulate air within the interior portion 406. This may facilitate even distribution of heat over membrane 418 to activate adhesive 420.

In some embodiments, the flow regulator 412 may be used to maintain a set temperature and/or pressure in interior portion 406.

The backpack 402 may or may not also be heated from the outside. The heated air in interior portion 406 may negate and/or reduce the need for heat applied to the backpack 402 from the outside.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method for laminating a membrane to a surface of an article comprising:
    hanging an article assembly from an air connector coupled to atop inside surface of a lamination machine, the article assembly including:
        an article body having a three-dimensional conformation with an inner surface and an opening;
        a membrane disposed in an interior portion of the article body against the inner surface of the article body; and
        a heat-activated adhesive disposed between the membrane and the article body;
    pumping, via the air connector, compressed air into the interior portion of the article body to press the membrane against the inner surface of the article body;
    heating the compressed air or air around the article body to activate the adhesive; and
    rotating, by the air connector, the article assembly about an axis of the air connector to facilitate distribution of heat over the adhesive.

2. The method of claim 1, further comprising:
    coupling a sleeve of material to a top edge of the article body adjacent the opening in the article body;
    inserting a plug into the sleeve; and
    coupling the plug to the air connector coupled to the top surface of the lamination machine to provide the compressed air.

3. The method of claim 2, wherein the membrane forms the sleeve of material.

4. The method of claim 2, further comprising removing the sleeve of material after lamination of the membrane to the inner surface of the body.

5. The method of claim 1, further comprising pumping compressed air into an interior portion of the article body prior to placing the article assembly in the lamination machine.

6. The method of claim 1, wherein the compressed air is heated.

7. The method of claim 6, further comprising activating one or more fans disposed in the interior portion of the article body to circulate the heated compressed air.

* * * * *